United States Patent [19]

Hamuro et al.

[11] Patent Number: 5,486,377
[45] Date of Patent: Jan. 23, 1996

[54] METHOD FOR MANUFACTURING CHIP-LIKE ELECTRONIC PARTS

[75] Inventors: Mitsuro Hamuro; Shigeyoshi Matsuda; Shoichi Kawabata, all of Nagaokakyo, Japan

[73] Assignee: Murata Manufacturing Co., Ltd., Kyoto, Japan

[21] Appl. No.: 206,159

[22] Filed: Mar. 7, 1994

[30] Foreign Application Priority Data

Mar. 5, 1993 [JP] Japan .................. 5-071153

[51] Int. Cl.⁶ .................. C23C 18/31; H01G 13/00
[52] U.S. Cl. .................. 427/79; 29/593; 205/128; 205/145; 427/123
[58] Field of Search .................. 205/128, 145; 427/79, 123, 266, 269, 287; 118/423, 426; 29/593

[56] References Cited

U.S. PATENT DOCUMENTS

| | | | |
|---|---|---|---|
| 3,323,492 | 6/1967 | Mellar et al. | 118/620 |
| 3,966,581 | 6/1976 | Holte | 204/202 |
| 4,113,577 | 9/1978 | Ross et al. | 205/15 |
| 4,312,716 | 1/1982 | Maschler et al. | 204/15 |
| 4,576,685 | 3/1986 | Goffredo et al. | 204/30 |
| 4,953,283 | 9/1990 | Kawabata et al. | 29/593 |

*Primary Examiner*—John Niebling
*Assistant Examiner*—William T. Leader
*Attorney, Agent, or Firm*—Wenderoth, Lind & Ponack

[57] ABSTRACT

Electronic parts are stuck into holes provided in an elongated retainer sheet and thereby retained. The retainer sheet as a transfer medium for the electronic parts is made to pass through a plating bath, a cleaning and drying section, an electrical characteristic measuring section, and a takeout section in turn. This allows the electronic parts 1 to be subjected to a plating process on their external electrodes, an electrical characteristic measuring process, and a taping process in a continuous manner. As a result, reduction in the number of handling manhours in the individual processes as well as space saving can be realized, while productivity can be improved.

6 Claims, 3 Drawing Sheets

FIG.7(A)
FIG.7(B)
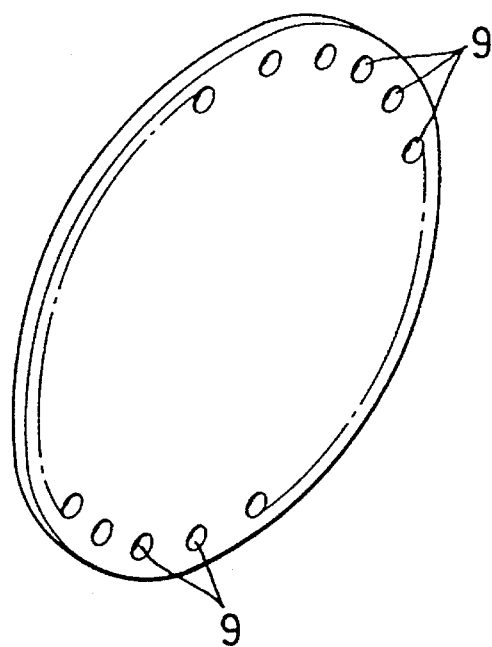
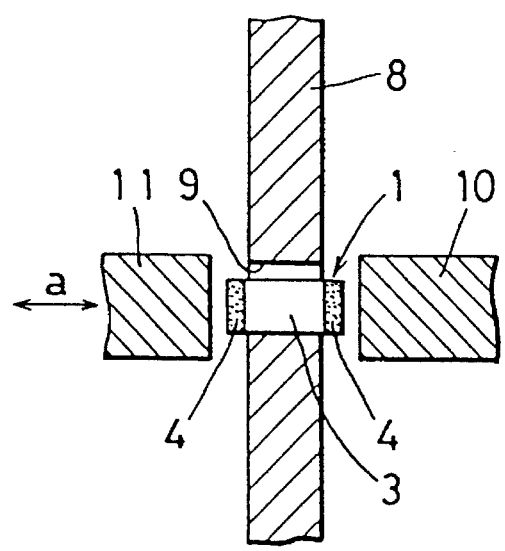
FIG.8
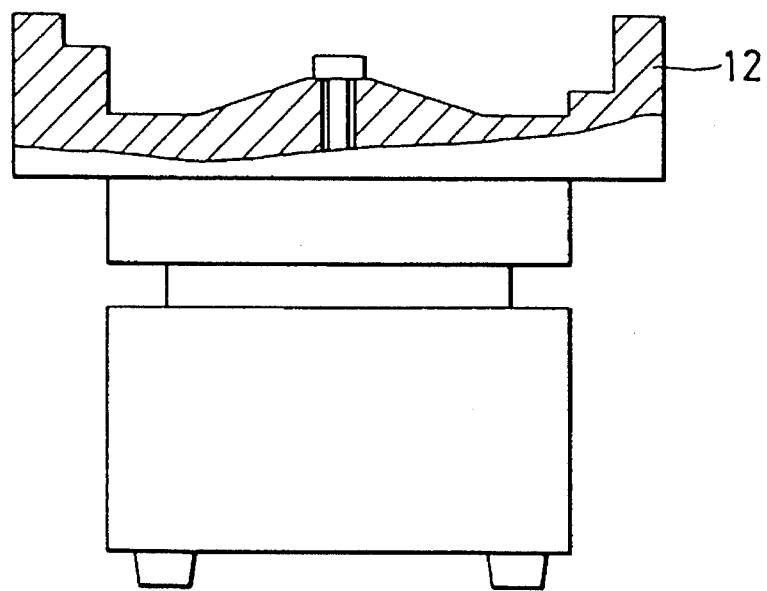

METHOD FOR MANUFACTURING CHIP-LIKE ELECTRONIC PARTS

BACKGROUND OF THE INVENTION

1. Field of the Invention

The present invention relates to a method for manufacturing chip-like electronic parts and, more particularly, to such a method in which a plating process on external electrodes and various processes required to succeed can be continuously carried out.

2. Description of the Prior Art

FIGS. 5(A) and 5(B) show a monolithic capacitor as an example of a chip-like electronic part 1. The monolithic capacitor has a structure in which external electrodes 4, 4 are provided at both ends of a ceramic device 3 having a plurality of internal electrodes 2 in such a way that the external electrodes 4, 4 conduct with the internal electrodes 2.

The external electrodes 4, 4 each comprise an inside electrode 5 provided by printing or applying a paste such as Ag—Pd, Ag, or Cu to an end of the ceramic device 3 and plating the paste, and a plated layer 6 provided on the surface of the inside electrode with Ni, Sn, solder, or the like for preventing the electrodes from aggression during soldering onto the printed circuit board and for improvement in solderability.

In manufacturing the monolithic capacitor, formation of the inside electrode 5 at the end of the ceramic device 3 is followed by a plating process on the inside electrode 5, a plate drying process, a measurement process for measuring electrical characteristics such as electrostatic capacity and insulation resistance, and a taping process, in this order.

The plating process has conventionally been implemented by using a barrel bath 7, as shown in FIG. 6, into which chip-like monolithic devices and steel balls are accommodated in a certain quantity. The barrel bath 7 is rotated in a plating bath, whereby a plating layer is deposited on the surface of the inside electrode.

The electrical characteristic measuring process has been carried out hitherto in the following manner. A rotary table 8 as shown in FIG. 7(A) is provided with a round hole 9 slightly larger than the diagonal size of the device 3 at regular intervals. The electronic part 1 is inserted into this round hole 9 while it is kept in a fixed position by a bowl-type feeder and a linear feeder. Then the rotary table 8 is rotated, causing a stationary terminal 10 and a movable terminal 11 to move in the direction of arrow a, as shown in FIG. 7(B), so that the external electrodes 4, 4 are brought into contact with the two terminals 10 and 11. In this state, electrostatic capacity, withstand voltage, insulation resistance, and other electrical characteristics are measured.

In this measuring process, the rotary table 8 rotates at high speed, and the productive ability of this measuring apparatus is normally not less than 400 pcs/min. To match the high speed operation, the travel of the movable terminal 11 is approximately 0.5 mm. Therefore, between the electronic part 1 inserted into the rotary table 8 and each of the terminals 10, 11, there is only a clearance as small as approximately 0.1 mm, so that the electronic part 1 rotates in contact with the terminals 10, 11 while the rotary table 8 rotates.

In the above-described conventional plating process, devices 3 would be stirred so as to collide with one another during the rotation of the barrel bath 7. As a result, chips and cracks would occur to the devices 3, and besides the plating layer could not be formed at uniform thickness for the individual accommodated devices, disadvantageously.

Also, since the conventional measuring apparatus requires the electronic part 1 to be fed in a certain position, such a bowl-type parts feeder 12 as shown in FIG. 8 is used. When the parts feeder 12 is used, the same electronic parts move and slide within the bowl many times, causing the external electrodes 4 to be dirtied. These deposits and scratches could cause the measurement of electrostatic capacity to result in false values of capacity. This in turn may adversely affect the measurement of insulation resistance, causing the insulation resistance to lower during the measurement.

Further, in the measuring apparatus, the external electrodes 4 rotate in contact with the terminals 10, 11 while the rotary table 8 rotates. As a result, impulses due to press contact of the terminals 10, 11 may cause scratches to develop to the two external electrodes 4, 4 of the devices 3, or contact with the corners of the terminals 10, 11 may cause chips and cracks to develop to the devices 3.

SUMMARY OF THE INVENTION

Accordingly, to solve these and other problems, it is an object of the present invention to provide a method for manufacturing chip-like electronic parts, by which uniform plating film thickness can be obtained for external electrodes, processes subsequent to formation of the external electrodes can be implemented continuously, electrical. characteristics can be measured with high accuracy, and by which chips and cracks can be prevented from occurring in the devices.

To solve the above-described problems, the present invention provides a method for manufacturing chip-like electronic parts, in which, while chip-like electronic parts are held by a retainer sheet, a plating process on the chip-like electronic parts and the subsequent processes are carried out continuously.

More specifically, while chip-like electronic parts are held by the retainer sheet, the electronic parts are made to pass through the plating bath with the retainer sheet used as a transfer medium, whereby the plating process on the external electrodes is accomplished. Then the retainer sheet is moved as it is, through which the drying process, the electrical characteristic measuring process, and the taping process are implemented, continuously.

BRIEF DESCRIPTION OF THE DRAWINGS

FIG. 7(A) is a perspective view of the rotary table in the conventional electrical characteristic measuring system; and FIG. 7(B) is a longitudinal sectional view of the same measuring system; and FIG. 8 is an explanatory view of the bowl-type parts feeder.

DETAILED DESCRIPTION OF THE PREFERRED EMBODIMENTS

Hereinbelow, an embodiment of the present invention is described with reference to FIGS. 1 through 4 of the accompanying drawings.

Figure 1:
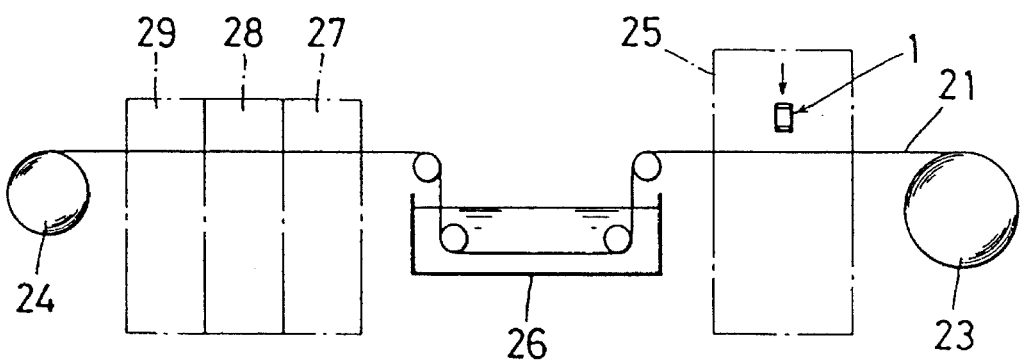
FIG. 1 is a process explanatory view showing the manufacturing method of the present invention.
Figure 2:
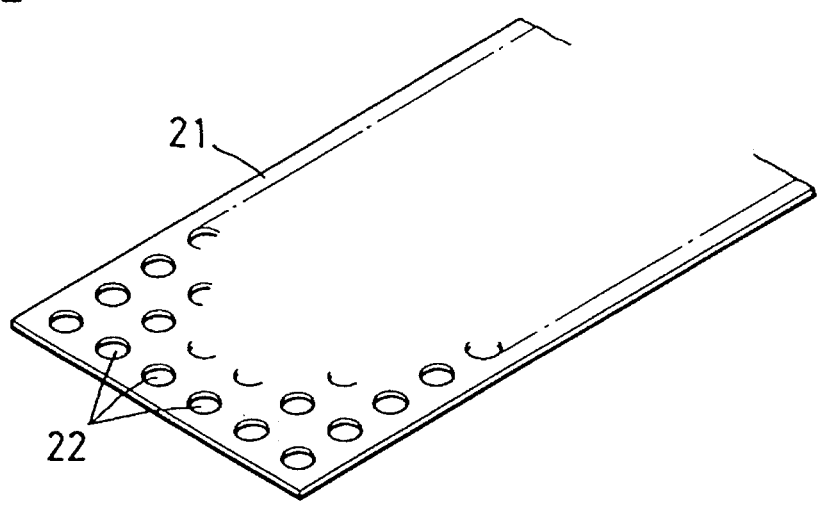
FIG. 2 is a perspective view of the retainer sheet used in the same method.
Figure 3:
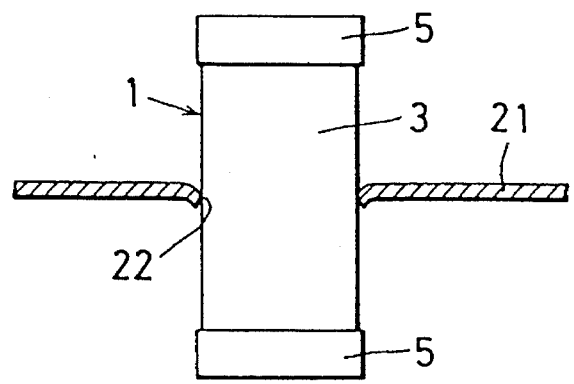
FIG. 3 is an enlarged longitudinal sectional view showing how the retainer sheet retains an electronic part.

As shown in FIGS. 1 to 3, a retainer sheet 21 to be used as a transfer medium for chip-like electronic parts 1 is in the form of an elongated continuous strip. To retain the chip-like electronic part 1, the retainer sheet 21 is provided with a large number of holes 22 slightly smaller than the diagonal size of a device 3 or, in the case of a cylindrical device 3, than its outside diameter.

The shape of these holes 22 may be circular, rectangular, hexagonal, or any other capable of retaining and fixing the chip-like electronic part 1.

Also, the material of the retainer sheet 21 may be either metal or synthetic resin film. In order that the retainer sheet 21 is used as a transfer medium for the plating process and the electrical characteristic measuring process, insulating rubber or synthetic resin film is preferably used as the material.

FIG. 1 shows a manufacturing process in which the plating process on the electronic part 1 and the subsequent processes are continuously carried out by using the elongated retainer sheet 21. On the way of a travel line along which the rolled retainer sheet 21 is fed from a take-off reel 23 to a take-up reel 24, there are provided an insert section 25 for the electronic part 1, a plating bath 26, a cleaning and drying section 27, an electrical characteristic measuring section 28, and a takeout section 29 along the direction of the travel of the retainer sheet 21.

The retainer sheet 21 is provided with a large number of holes 22 as shown in FIG. 2. Into these holes 22, the chip-like electronic parts 1 are inserted at the insert section 25.

The chip-like electronic parts 1 are retained in such a position, as shown in FIG. 3, that an electronic part 1 vertically penetrate through the hole 22 with the inside electrodes 5, 5 positioned upside and downside.

The retainer sheet 21 that has retained the electronic parts 1 in the holes 22 at the insert section 25 is traveled to pass through the plating bath 26, where the electronic parts 1 are immersed in and passed through the plating solution. Thus, a plating layer is formed on the surface of the inside electrodes 5, 5, whereby external electrodes 4, 4 are formed.

The electronic parts 1 pass through the plating solution, while being retained by the retainer sheet 21 as shown in FIG. 3. Therefore, a plating layer of uniform thickness can be formed.

The electronic parts 1 that have passed through the plating bath 26 then pass through the cleaning and drying section 27, where the plating layer is dried so that external electrodes 4, 4 are finished. Subsequently, the electronic parts 1 go on to the electrical characteristic measuring section 28.

For measurement of electrical characteristics of the electronic parts 1 at the electrical characteristic measuring section 28, the electronic parts 1 retained as stuck into the holes 22 with the external electrodes 4, 4 positioned at upper and lower surfaces of the retainer sheet 21 can be measured for withstand voltage simultaneously by a group of electronic parts 1 while, for example, a plurality of electronic parts 1 arrayed in a row are pinched by upper and lower terminals. Further, the electronic parts 1 can be measured for electrostatic capacity by scanning.

In this case, since a plurality of parts are simultaneously measured, the measuring terminals can be slowed in speed to come into contact with the external electrodes 4, 4 at both sides of the electronic parts 1. This allows impulses due to the contact to be reduced substantially. As a result, there is no possibility that scratches on the external electrodes 4, 4 or cracks and chips of the devices 3 may take place.

The electronic parts 1 over the electrical characteristic measurement go on to the takeout section 29, where they are withdrawn from the retainer sheet 21. The retainer sheet 21 is rolled up by the take-up reel 24.

At the takeout section 29, the electronic parts 1 are retained in the retainer sheet 21. Therefore, they may be taken out as they are, and can be subjected to the taping process in which the electronic parts 1 are packaged with packaging tape, continuously.

Figure 4:
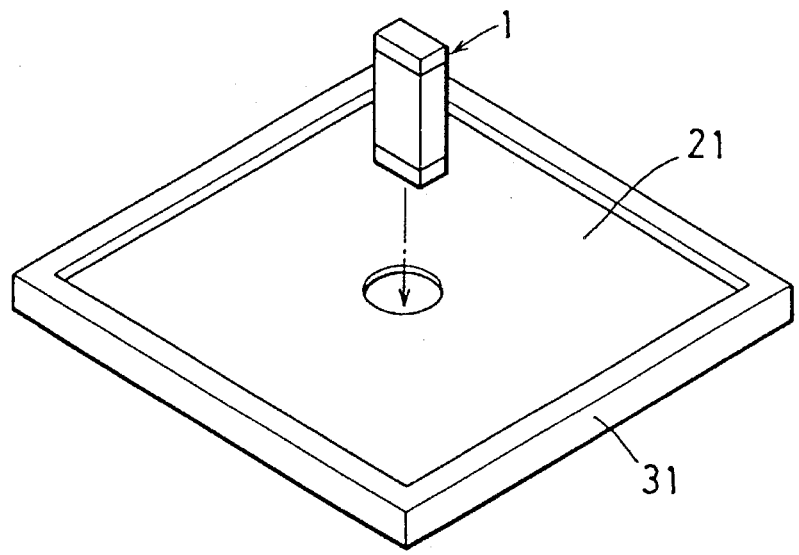
FIG. 4 is a perspective view showing another example of the retainer sheet.
Figure 5A:
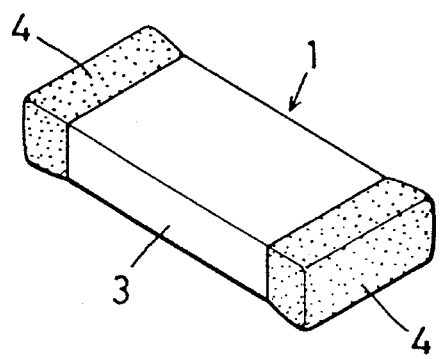
FIG. 5(A) is a perspective view of the chip-like electronic part.
Figure 5B:
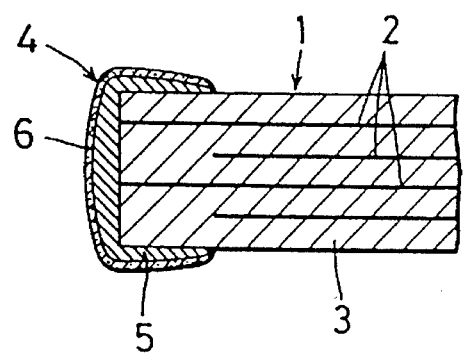
FIG. 5(B) is a longitudinal sectional view showing the external electrode of the same chip-like electronic part.
Figure 6:
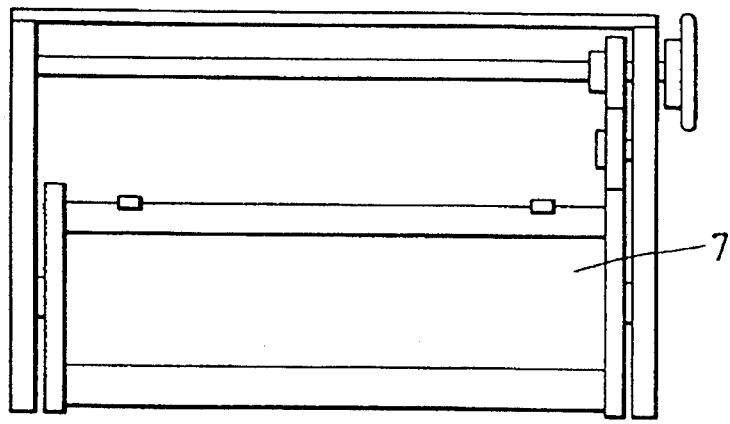
FIG. 6 is a front view of the barrel bath.

It is noted that although the retainer sheet 21 has been exemplified by a continuous elongated carrier sheet in the present embodiment, yet another retainer sheet 21 stretched within a frame 31 and provided with a hole 22 may instead be used as the transfer medium as shown in FIG. 4.

As shown above, according to the present invention, chip-like electronic parts are retained in holes provided in the retainer sheet, in which state the plating process on the external electrodes and the subsequent processes are performed continuously. Accordingly, it becomes possible to continuously perform the treatment processes on the electronic parts, so that improvement in productivity and space saving can be realized.

Further, by the transfer of electronic parts by the retainer sheet, it becomes possible to reduce the number of handling manhours for the individual processes and to change the processing method. Besides, scratches and adhesion of dirt on the external electrodes, which would be involved in the use of the conventional bowl-type feeder, can be eliminated, so that any insulation resistance faults can be prevented in the electrical characteristic measuring process. Moreover, the possibility of occurrence of cracks and chips of the devices during the electrical characteristic measuring process can be reduced to a substantial extent.

What is claimed is:

1. A method for manufacturing an electronic part having a ceramic central body and two external electrodes formed on opposite ends of the central body, each external electrode being comprised of an inside electrode and a plated layer, said method comprising the steps of:

providing an electronic part having a ceramic central body and two inside electrodes formed on opposite ends of the central body, providing a retainer sheet having opposite sides and having a plurality of spaced openings therethrough for receiving and holding the central body of the electronic part, inserting one of the ends of the electronic part into one of the plurality of spaced openings of the retainer sheet so that the central body of the electronic part is held by the retainer sheet and so that the two inside electrodes formed on opposite ends of the central body are disposed on opposite sides of the retainer sheet, moving the retainer sheet holding the electronic part to a plating station for passing the electronic part with the two inside electrodes through a plating liquid, thereby plating the two inside electrodes of the electronic part to form external electrodes thereon, and moving the retainer sheet holding the plated electronic part to a cleaning and drying station for cleaning and drying the plated electronic part of excess plating liquid to obtain the electronic part having a ceramic central body and two external electrodes formed at opposite ends thereof.

2. The method of claim 1, further comprising a step of moving the retainer sheet holding the cleaned and dried plated electronic part to an electrical measurement station for measuring an electrical characteristic of the plated electronic part.

3. The method of claim 1, further comprising a step of moving the retainer sheet holding the cleaned and dried plated electronic part to a takeout section for removing the electronic part from the retainer sheet.

4. The method of claim 1, wherein the retainer sheet is formed from an insulating rubber sheet or synthetic resin film.

5. The method of claim 1, wherein the retainer sheet is a continuous belt which is moved for continuously delivering the electronic part from station to station along a predetermined path.

6. The method of claim 1, wherein the retainer sheet is a discrete body which is moved for continuously delivering the electronic part from station to station along a predetermined path.

* * * * *